United States Patent Office 3,337,572
Patented Aug. 22, 1967

3,337,572
BENZOTHIAZOLYL AND BENZOXAZOLYL
CARBAMATES
John R. Kilsheimer, Westfield, John D. Behun, Scotch
Plains, and Harold A. Kaufman, Piscataway, N.J., assignors to Mobil Oil Corporation, a corporation of New York
No Drawing. Filed Jan. 25, 1965, Ser. No. 427,910
3 Claims. (Cl. 260—304)

This application is a continuation-in-part of application for Letters Patent Ser. No. 411,559, filed Nov. 16, 1964 and now abandoned, by John R. Kilsheimer, John D. Behun and Harold A. Kaufman.

The present invention relates to a novel class of benzothiazole and benzoxazole carbamates, and to their use as pesticides. More particularly, the invention relates to benzothiazole and benzoxazole carbamates in which the carbamate group is linked to the carbocyclic ring of the benzothiazole or benzoxazole, and which have the following formula:

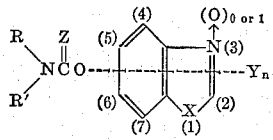

wherein R is selected from H, alkyl ($C_1$–$C_8$), alkenyl ($C_2$–$C_8$), cycloalkyl ($C_3$–$C_8$) and cycloalkenyl ($C_3$–$C_8$); R' is selected from H, alkyl ($C_1$–$C_8$), alkenyl ($C_2$–$C_8$), cycloalkyl ($C_3$–$C_8$), cycloalkenyl ($C_3$–$C_8$), phenyl and halophenyl; Z is selected from O and S; X is selected from O, S, SO, and $SO_2$; Y is selected from hydroxy, halogen, nitro, alkyl ($C_1$–$C_4$), alkenyl ($C_2$–$C_4$), amino, alkylamino, dialkylamino, mercapto, alkylmercapto, cyano (—CN), thiocyano (—SCN), and alkoxy ($OCH_3$ to $OC_8H_{17}$); in which $n$ is zero, one, two, three or four; and in which each Y, when $n$ is other than zero, is linked to one of positions 2, 4, 5, 6 and 7 of the benzothiazole or benzoxazole structure. In the structural formula shown above, the numerals in parentheses designate the positions in the rings.

Synthesis of the novel compounds represented by the foregoing generic formula can be accomplished by various methods. A convenient method generally applicable includes the action of an alkyl isocyanate, e.g. methyl isocyanate, with a benzothiazole or benzoxazole having a reactive group substituted on the carbocyclic ring, e.g. hydroxybenzothiazole, hydroxybenzoxazole, etc., in which there is a hydroxy group situated on the 4, 5, 6 or 7 positions of the benzothiazole or benzoxazole structure. Preferably, the reaction is conducted in the presence of a catalytic amount of a compound capable of catalyzing the reaction, e.g. dibutyl tin diacetate or a tertiary amine and in a suitable organic liquid reaction medium, e.g. an aromatic or aliphatic compound such as toluene, cyclohexane, etc. Following the synthesis reaction, the normally solid novel compounds can be separated from the reaction mixture by any suitable method, e.g. filtration, and purified by any appropriate technique such as recrystallization from an organic liquid solvent or eluation chromotography.

The following examples illustrate the preparation of compounds of the novel class to which this invention relates. It will be appreciated that this invention is not limited to the specific compounds prepared in the examples, which are merely representative of the novel class of compounds described hereinbefore, as those skilled in the art will readily understand.

Example 1

The intermediate 4-hydroxybenzoxazole was prepared by the method of Sorkin, Roth and Erlenmeyer described at page 1740 of Helv. Chem. Acta. (1952). Five parts of the 4-hydroxybenzoxazole, 2.5 parts of methyl isocyanate and a catalytic quantity of dibutyl tin diacetate were combined in 100 parts of toluene contained in a stoppered glass pressure vessel, which was then heated on a steam bath for two hours. The colorless solid derivative (five parts) which formed when the reaction mixture cooled was separated by filtration and purified by recrystallization from hot toluene. The purified compound was found to have a melting point of 137–138° C. and was identified as 4-benzoxazolyl N-methylcarbamate by its infrared spectrum and elemental analysis. Analysis of two samples of the compound showed they contained 14.59% and 14.51% nitrogen. (The calculated nitrogen content of 4-benzoxazolyl N-methylcarbamate is 14.58%.)

Example 2

The intermediate 4-hydroxybenzothiazole was prepared by the method of Feng and Fernando described at page 2115 of Vol. 82 of the Journal of the American Chemical Society (1960). Five parts of the 4-hydroxybenzothiazole, four parts of methyl isocyanate and a catalytic quantity of dibutyl tin diacetate were combined in 350 parts of toluene contained in a stoppered glass pressure vessel, which was then heated on a steam bath for 70 minutes. After cooling, the vessel was opened and the contents were concentrated by evaporation of the solvent. The colorless solid derivative (five parts) which separated was purified by eluation chromotography, providing a pure compound having a melting point of 142–143° C. The compound was identified by its infrared spectrum and elemental analysis as 4-benzothiazolyl N-methylcarbamate. Analysis of two samples of the compounds showed they contained 13.47% nitrogen; the calculated value for nitrogen content of the compound was 13.46%.

Intermediates useful in the preparation of the novel class of benzothiazole and benzoxazole carbamates of this invention can be produced by any of numerous convenient methods which include those cited in Examples I and II. As stated hereinbefore, the novel compounds of this invention include those in which the carbamate group is linked to any of positions 4, 5, 6 or 7 on the carbocyclic ring. Various substituted benzothiazoles or benzoxazoles with hydroxyl groups in the 4-, 5-, 6- or 7-positions and useful as intermediates in the preparation of the novel carbamates of this invention can be prepared by methods described in the technical literature. See, for example, T. Nishizawa and H. Shiga, J. Pharm, Soc. Japan, vol. 63, pp. 441–43 (1943) and Chem. Abs., vol. 45, p. 5151c (1951); A. I. Kiprianov and B. I. Dashevskaya, Zhur. Obshchei Khim. (J. Gen. Chem.), vol. 19, pp. 1158–66 (1949) and Chem. Abs., vol. 43, p. 9453d (1949); D. D. Levkoev et al., Sbornik Statei Obschei Khim., vol. 2, pp. 1263–72 (1953) and Chem. Abs., vol. 49, p. 5443i (1955); J. Haginiwa, J. Pharm. Soc. Japan, vol. 73, pp. 1310–12 (1953) and Chem. Abs., vol. 49, p. 298c (1955); and A. H. Beckett and K. A. Kerridge, J. Pharm. and Pharmacol., vol. 8, pp. 661–65 (1956), and Chem. Abs., vol. 51, p. 2739a (1957). In order to obtain one of the novel compounds having the carbamate group linked to a particular one of such positions, it is only necessary to use an intermediate having a hydroxyl substituent in the corresponding position on the carbocyclic ring, for example 4-hydroxybenzoxazole, 6-hydroxybenzoxazole, 7-hydroxybenzothiazole, etc.

Novel dialkyl, alkenyl, alicyclic and aryl carbamates of the described class can be derived from hydroxybenzoxazole and hydroxybenzothiazole intermediates in the manner described in Examples I and II by using, in place of the methyl isocyanate, an appropriate dialkyl compound (e.g. dimethylcarbamyl chloride), alkenyl compound (e.g. allyl isocyanates), alicyclic compound (e.g. cyclopropyl isocyanate) or aryl compound (e.g.

para-chlorophenyl isocyanate). In another method of preparing the novel carbamates of this invention 4, 5, 6 or 7-hydroxy benzoxazole or benzothiazole is reacted with phosgene in the presence of a tertiary amine (HCl scavenger), e.g. N,N-dimethylaniline, providing a chloroformate intermediate which is then converted to the desired novel carbamate by reaction with the appropriate amine, e.g. dimethylamine, allylamine, cyclohexylamine, etc. Similarly, the novel thionocarbamates of this invention, i.e. those having a —OCSNRR' radical linked to the carbocyclic ring, can be prepared in the same manner by using an appropriate thioisocyanate in place of the methyl isocyanate or, alternately, by using thiophosgene to provide a thiochloroformate intermediate and then reacting the thiochloroformate with an amine.

The novel class of compounds of this invention also includes benzoxazolyl carbamates and benzothiazolyl carbamates having one, two, three or four additional substituents each substituted at any of positions 2, 4, 5, 6 and 7 to which there is not attached a carbamate group. Such additional substituents can be a halogen, hydroxy, nitro, alkyl ($C_1$–$C_4$), alkenyl ($C_2$–$C_4$), amino, alkylamino, dialkylamino, mercapto, alkylmercapto, cyano (—CN), thiocyano (—SCN) or alkoxy ($OCH_3$ to $OC_8H_{17}$). Also included are benzothiazole carbamates in which one or two oxygen atoms are linked to the sulfur atom situated in the thiazole ring.

Any of the foregoing novel carbamates having one or more additional ring substituents can be prepared in the manner described above by using the correspondingly substituted benzoxazole or benzothiazole intermediate in the synthesis reaction. For example, 2-methyl-6-hydroxybenzoxazole and 2-benzyl-4-hydroxybenzoxazole can be used to prepare the correspondingly substituted novel benzoxazolyl carbamates, i.e., 2-methyl-6-benzoxazolyl N-methylcarbamate and 2-benzyl-4-benzoxazolyl N-methylcarbamate, respectively; also for example, 2-methyl-5-hydroxybenzothiazole, 2 - chloro - 5 - phenyl - 6 - hydroxybenzothiazole and 2-methyl-7-hydroxybenzothiazole can be used to prepare the correspondingly substituted novel bonzothiazolyl carbamates, i.e., 2-methyl-5-benzothiazolyl, 2-chloro-5-phenyl-6-benzothiazolyl and 2-methyl-7-benzothiazolyl N-methylcarbamates, respectively.

In general, when reacting an alkyl isocyanate with a hydroxybenzoxazole or hydroxybenzothiazole to form compounds such as those produced in Examples I and II, it is preferable to use a slight molar excess, e.g. between 2 and 10 percent, of the isocyanate reactant in order to insure that the reaction is complete.

Reaction temperature is not critical; temperatures from somewhat below room temperature up to 100° C. or somewhat higher can be used. However, a reaction temperature between 25° C. and 90° C. is generally most satisfactory. The reaction can be conducted below or above atmospheric pressure, but a pressure of about one atmosphere or slightly higher is usually satisfactory.

Generally, it is preferable to conduct the reaction in an inert liquid medium such as an organic solvent, e.g. diethyl ether, an aromatic compound such as benzene or toluene, etc. It is also advantageous to catalyze the reaction, e.g. with a tin compound such as dibutyl tin diacetate or with a tertiary amine such as triethylamine or pyridine, but the reaction will proceed without a catalyst, although not as rapidly.

The novel compounds of this invention have been found to exhibit considerable biological activity, especially when used against agricultural pests. The compounds can be used in various ways to achieve biological action. They may be applied without prior dilution, as solids or in vaporized form, but are preferably applied as one of several components at a pesticidal composition or the like. The composition can be applied as dusts, as liquid sprays, or as gas-propelled sprays and may contain, in addition to a carrier, additives such as an emulsifying agent, a wetting agent, a binding agent, gases compressed to the liquid state, odorants, stabilizers, etc.

The novel compounds can be used in a wide variety of concentrations in pesticidal or similar compositions, with the concentration in each composition depending on the purpose for which it will be used, the application method contemplated, the nature of the condition to be controlled, and other commonly encountered factors. Concentrations as low as 0.0001 percent are effective for some purposes. In general, compositions containing between about 0.05 and about 0.5 percent, by weight, in either a liquid or solid carrier give excellent results. For some purposes, stronger concentrations up to about 10 percent or higher may be desirable. Liquid carriers which may be employed include water, organic solvents, mineral oils, and other solvents and suspension media. Suitable solid carriers include talc, bentonite, gypsum, diatomaceous earth, pyrophyllite, fuller's earth, flours derived from cotton seeds or walnut seeds, various natural clays and other similar powdered materials.

The following results are representative of the high activity of the compounds of this invention when used, for example, against pests of the coleoptera, homoptera and arachnida classes, for example the Mexican bean beetle (*Epilachna verivestis* Muls), the pea aphid (*I. pisi*), and the two-spotted spider mite (*T. telarius*), respectively. For purposes of the activity tests, the novel compounds produced as described in Examples I and II were formulated as wettable powders and then diluted with water to concentrations of 1000 parts per million, by weight. In tests of activity against Mexican bean beetles, cranberry bean plants were dipped into the formulation and then allowed to dry. Third instar larvae of the beetles were then caged on the treated plants and maintained under greenhouse conditions for 48 hours, after which the mortality counts were made. In tests of activity against pea aphids, the formulation was sprayed for 5 seconds at 20 pounds pressure onto wingless adult pea aphids confined in spherical wire mesh cages. The treated aphids were then transferred to and caged on untreated broad bean plants and maintained under greenhouse conditions for 72 hours, after which the mortality counts were made. In tests of activity against two-spotted spider mites, cranberry bean plants infested with various life stages of the mites were dipped in the formulation and allowed to dry. The treated plants were then maintained under greenhouse conditions for 72 hours, after which the mortality counts were made. A reference standard, Sevin (1-naphthyl N-methylcarbamate), was formulated in the same manner and used in comparative activity tests. The test results demonstrating the activity of the novel compounds of this invention and comparing their activity to that of Sevin are set forth in the following table.

PERCENT MORTALITY USING 1,000 P.P.M. OF COMPOUND IN WATER

|  | Mexican Bean Beetle | Pea Aphid | Two-Spotted Spider Mite |
| --- | --- | --- | --- |
| 4-benzothiazolyl N-methylcarbamate | 100 | 100 | 100 |
| 4-benzoxazolyl N-methylcarbamate | 100 | 28.6 | 100 |
| Sevin (1-naphthyl N-methylcarbamate) | 100 | 2.0 | 0.0 |

From the foregoing test results, it can be seen that the novel benzoxazole and benzothiazole carbamates of this invention are effective in combating important agricultural pests, such as those of the coleoptera, homoptera, and arachnida classes, and are for important purposes much more effective than a widely used pesticide, 1-naphthyl N-methylcarbamate. As is apparent from the foregoing data, the novel compounds of this invention are highly effective combination insectide-miticides whereas, by comparison, a conventional carbamate such as Sevin is not so effective in view of its substantial ineffectiveness against many aphids and spider mites.

Although the present invention has been illustrated with preferred embodiments, it is to be understood that modifications and variations may be employed without departing from the spirit and scope of this invention, as those skilled in the art will readily understand. Such variations and modifications are therefore considered to be within the purview and scope of the appended claims.

We claim:
1. A compound having the following formula

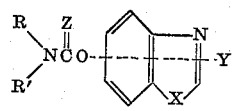

wherein R and R' are selected from the group consisting of hydrogen, lower alkyl, cycloalkyl containing from three to six carbon atoms, allyl, phenyl, and halophenyl, Y is selected from the group consisting of hydrogen, lower alkyl, halogen, benzyl, and phenyl, and X and Z are selected from the group consisting of oxygen and sulfur.

2. 4-benzoxazolyl N-methylcarbamate.
3. 4-benzothiazolyl N-methylcarbamate.

No references cited.

ALEX MAZEL, *Primary Examiner.*
RICHARD J. GALLAGHER, *Assistant Examiner.*

UNITED STATES PATENT OFFICE
CERTIFICATE OF CORRECTION

Patent No. 3,337,572                                                  August 22, 1967

John R. Kilsheimer et al.

It is hereby certified that error appears in the above numbered patent requiring correction and that the said Letters Patent should read as corrected below.

Column 1, line 45, for "action" read -- reaction --; column 2, line 27, for "eluation" read -- elution --; line 71, for "isocyanates" read -- isocyanate --; column 3, line 41, for "bonzothiazolyl" read -- benzothiazolyl --; line 71, for "at a " read -- of a --.

Signed and sealed this 13th day of August 1968.

(SEAL)
Attest:

Edward M. Fletcher, Jr.                                      EDWARD J. BRENNER

Attesting Officer                                                    Commissioner of Patents